Patented Oct. 12, 1943

2,331,838

UNITED STATES PATENT OFFICE 2,331,838

METHOD OF RECOVERING LITHIUM FROM MINERALS

Axel Rudolf Lindblad and Sven Johan Walldén, Stockholm, and Karl Arne Sivander, Skelleftehamn, Sweden, assignors to Bolidens Gruvaktiebolag, Stockholm, Sweden, a limited joint-stock company of Sweden No Drawing. Application June 20, 1939, Serial No. 280,152. In Sweden June 22, 1938

10 Claims. (Cl. 23—31)

The present invention refers to a method of recovering lithium from lithium-containing minerals, such as amblygonite, lepidolite, petalite, spodumene and so forth, by lixiviation with an aqueous solution of metal salts.

A number of methods of extracting lithium from the minerals thereof are previously known. Those methods which have reached some importance are based on acid methods of decomposition and on ion exchanging reactions between alkaline compounds or compounds of the alkaline earths and the mineral at temperatures above 800 degrees centigrade. The acid methods of decomposition suffer from the disadvantage that the whole mineral skeleton is destroyed and dissolved. Great difficulties are then met with in separating out non-desirable dissolved compounds. Only where the working of high-percentage minerals, such as amblygonite, is brought into consideration would the method be of any practical importance. The methods of recovering lithium by means of an exchanging reaction involve a great advance as against the methods just mentioned. This group of methods comprises the known methods of technical working silicate minerals. Hereby, a commercial exploitation of rather low-percentage lithium ores has been rendered possible. The working costs are still considerable, however, by reason, inter alia, of great heating costs, expensive reaction agents (potassium sulphate), expensive grinding of the mineral, and expensive furnace apparatus.

We have worked out a third type of extracting method which will considerably simplify the working of the minerals and render such working cheaper. This novel type of method is distinguished by the feature that the lithium content of the minerals is lixiviated by means of a water solution of neutral metal salts.

Metal salts which have proved particularly suitable for this dissolving-out operation, are salts of sodium and potassium and the metals of the alkaline earths. In the working of spodumene, for example, with a sodium sulphate solution, lithium and other alkalis more or less enter into solution as sulphates, while sodium ions enter into the mineral from the solution and are bound in place of the dissolved-out ions.

In the lixiviation of the minerals in their natural state, the ion exchange takes place rather slowly. It will be found to be advantageous, therefore, to heat the minerals to a high temperature, such as 700 to 1200 degrees centigrade, prior to the lixiviation process. At the heating, the minerals will break through heat tensions. In some cases, as in the heating of spodumene, recrystallisations will also set in within the material, whereby this breaking is increased still more. This breaking of the minerals augments the mineral surface and makes it easier to crush the mineral grains.

The extracting reaction progresses comparatively slowly when the lixiviation is undertaken at ordinary temperature, by reason of which the lixiviation is generally performed at a temperature of 100 to 300 degrees centigrade and at a pressure above atmospheric.

Recovery of lithium according to the method above described may be carried out with a good yield. Subsidiary reactions may set in, however, during the progress of the main reaction, which subsidiary reactions are responsible for the fact that the reaction of the lixiviation is rendered acid. It will then be found that the rapidity of the dissolving-out process for the lithium of the mineral may be reduced abnormally rapidly. Consequently, after lixiviation for some hours has proceded, the rapidity of reaction may be reduced to nearly zero. Therefore, if coarse-grained mineral is operated upon, it may be possible to dissolve out a small proportion only of the total contents of alkaline metals of the mineral. In order to obtain a satisfactory yield of lithium, it may be preferable to work minerals having an exceedingly large reaction surface per unit of weight. To produce such a material, the mineral is first preferably roasted and then ground very finely. Both of these procedures call for expensive apparatus and are expensive to carry into effect. Moreover, it will be necessary to make the apparatus wherein the lixiviation is carried out from expensive acid proof material.

We have also found that these difficulties may be obviated by an admixture to the lixiviating solution of small quantities of some substance producing an alkaline reaction, such as sodium hydroxide, sodium carbonate, lime and so forth. The apparatus may be made from ordinary iron and the rapidity of reaction can be maintained at a high level for a long time. Furthermore, the advantage is obtained that iron and aluminium that might be dissolved out from the mineral is precipitated from the solution in the process of lixiviation and may be filtered off together with the rest of the liquor.

While the inventors do not wish to be bound by any particular theory of operation, it is believed that the maintenance of the rapidity of reaction at a higher level, if the lixiviating solution produces an alkaline reaction, depends on the fact that the alkaline substance prevents the silicic acid dissolved out from the mineral during the lixiviation process from precipitating in the form of gel on the mineral surface. Such precipitation will take place if the lixiviating solution produces a neutral or acid reaction. The silicic acid then deposits between the mineral surface and the solution so as to prevent the diffusion of the alkali ions. It is true that the silicic acid is dissolved out to a higher extent when the lixiviating solution causes an alkaline reaction, but it will again precipitate together with the substance producing an alkaline reaction, and in such a form as not to prevent the dissolving out of the lithium. For example, when sodium hydroxide is added, a sodium-aluminium-silicate will be formed out of sodium hydroxide, silicic acid and aluminium dissolved out from the ore, the sodium hydroxide being then consumed to a great extent. It is by reason of such an alkali consumption that the lixiviating solution produces an acid reaction if no alkali is present.

It is a disadvantage that silicic acid is dissolved out from the mineral. If it precipitates again, the precipitating compound will always occlude some proportion of the substances to be recovered. If it remains in solution, it will cause difficulties in the further treatment of the lixiviating solution. It is of importance, therefore, not to add too much alkali to the lixiviating solution. The suitable admixture of alkali will vary for different materials. For spodumene, the best yields are obtained at an admixture of lime of about 10 g. per kilogram of spodumene, whereas with petalite the best yields are obtained at an admixture of lime of about 60 g. per kilogram of petalite.

The most suitable salts for the preparation of the lixiviating solution are the alkali metal salts. Particularly good yields are obtained with sulphate, above all sodium sulphate, which is also the cheapest alkali metal sulphate and which may be readily recovered from its water solution through crystallisation. In one respect, however, the use of an alkali metal sulphate involves some drawbacks. Generally, lithium is precipitated as lithium carbonate from the lithium-containing solutions obtained in the working. Since sulphate ions will materially increase the solubility of the lithium carbonate, a considerable proportion of the dissolved-out lithium quantity will remain in solution, and can be recovered only after the main proportion of the alkali metal sulphate has been crystallized out. Such crystallisation calls for expensive apparatus and involves considerable costs for steam, cooling water and labour.

We have found it to be advantageous in lixiviating lithium minerals with solutions of metal salts to make use of solutions of salts such as alkali metal chlorides or alkali metal nitrates which do not augment the solubility of the lithium carbonate. This will bring about that the percentage of lithium in the mother liquor of lithium carbonate may be lowered to such a value as to permit this solution to be used directly for the lixiviation of fresh mineral. Crystallisation of the reacting salt is rendered unnecessary in this way. In the lixiviation of spodumene with a sodium-nitrate-solution, it will thus be possible to obtain a concentration of lithium in the lixivium of 8 to 10 g. of lithium per liter, which concentration may be easily lowered below 1 g. per liter at the admixture of sodium carbonate to the boiling liquor.

However, the employment of salts which do not augment the solubility of the lithium carbonate entails other advantages as well. With the use, for instance, of sodium chloride as a reaction agent in place of sodium sulphate, considerably lower costs of chemicals will be obtained on account of the cheapness of the sodium chloride. Furthermore, it is possible to operate with apparatus of smaller sizes, for instance if sodium nitrate is used as a reaction agent in place of sodium sulphate. This is so for the reason that sodium nitrate has a considerably greater solubility in water, counted in gram equivalents per liter of solution.

Hereinabove, the use of alkali metal salts primarily has been considered as reaction agents. The present invention is not limited to the use of these salts, however, but includes the use of other neutral metal salts as well.

To every temperature corresponds a definite state of equilibrium between the lithium percentage in solution and the lithium percentage in the mineral. In order to get the greatest possible yield of lithium, the lixiviation is generally undertaken with a solution containing a rather great excess of the ions that are to drive out the lithium ions from the mineral. The excess may be reduced, however, by the lixiviation being performed in a manner such that material rich in lithium ions entering the lixiviation is treated with liquid already enriched with respect to the same ions, which liquid is then conveyed to further working for the recovery of alkaline salts, whereas partly lixiviated material which is poorer with respect to lithium ions and others is treated with entering lixiviating liquid which is free from lithium or has a low concentration of lithium ions. At the same time the advantage is gained that the escaping solution holds the highest possible quantity of lithium ions per unit of those ions by means of which the displacement is effected.

The lithium compound which it is desired, as a rule, to recover out of the lithium-containing liquors is lithium hydroxide. Such recovery generally is effected so that lithium carbonate is precipitated as an intermediary product out of the lithium-containing solutions obtained in the lixiviation of the mineral. The lithium carbonate is reduced to a suspension in water and is treated with lime, calcium carbonate and a solution of lithium hydroxide being thus obtained. This solution is evaporated; after the calcium carbonate has been filtered off, the lithium hydroxide being thus caused to crystallize. As the solution of lithium hydroxide cannot be produced directly in practice with a higher percentage of hydroxide than 35 to 40 g. per liter, great costs are involved in the evaporation of the lithium hydroxide solution in this method. Furthermore, the chemicals, apparatus and labour involve added costs in connection with the above-mentioned procedures.

We have worked out a method whereby the costs of producing lithium hydroxide out of the solution obtained in the lixiviation of lithium minerals with solutions of alkali metal sulphate are materially reduced. Instead of precipitating lithium out of the solution as carbonates, lithium sulphate is converted into lithium hydroxide by an admixture to the solution of a strong base which, if sodium sulphate be used as a reaction agent, is constituted by sodium hydroxide. The alkali metal sulphate formed at the same time crystallizes out together with entering alkali metal sulphate by cooling to a temperature in the proximity of 0 degree centigrade. After the sulphate has been filtered off, the mother liquor obtained is evaporated, pure lithium hydroxide being thus caused to crystallize.

The advantage of this method of producing lithium hydroxide resides, above all, in the fact that the costs of evaporation and labour become small.

What we claim is:

1. A method of recovering lithium from a lithium-containing mineral which comprises lixiviating the mineral with an aqueous solution of a neutral metal salt containing a substance producing an alkaline reaction, the amount of alkaline reacting substance added to said aqueous solution being not more than about 6% by weight of the amount of lithium-containing mineral being treated, and being sufficient to prevent the precipitation of silicic acid as a gel on the mineral surfaces but insufficient to materially increase the amount of siliceous material dissolved out of the mineral.

2. A method of recovering lithium from a lithium-containing mineral which comprises lixiviating the mineral with an aqueous solution of a neutral metal salt containing a substance producing an alkaline reaction, the amount of alkaline reacting substance added being sufficient to prevent the precipitation of silicic acid as a gel on the mineral surfaces but insufficient to materially increase the amount of siliceous material dissolved out of the mineral.

3. A method of recovering lithium from a lithium-containing mineral which comprises lixiviating the mineral with a water solution of a neutral metal salt, further characterized in that at least one substance producing an alkaline reaction is added to the metal salt solution in sufficient quantity such that, after the lixiviation has been completed, the solution will still have an alkaline reaction.

4. A method of recovering lithium from a lithium-containing mineral which comprises lixiviating the mineral with a water solution of a neutral metal salt, further characterized in that the mineral is lixiviated with a solution of an alkali metal sulphate, thereafter alkali metal hydroxide is added to the solution of lithium sulphate so obtained, the sulphate salts are crystallized out by cooling, and lithium hydroxide is recovered by evaporation.

5. In a method for recovering lithium from a naturally-occurring lithium-containing mineral, the steps comprising lixiviating the mineral with a water solution of a neutral metal salt containing in addition at least one substance producing an alkaline reaction selected from the group consisting of hydroxides of alkali metals and hydroxides of alkaline earth metals in an amount sufficient to prevent precipitation of silicic acid as a gel on the mineral surfaces but insufficient to materially increase the amount of siliceous material dissolved out of the mineral, thereby obtaining a lixivium containing lithium in the form of a relatively water-soluble compound thereof; and recovering lithium compound from said lixivium.

6. A method for recovering lithium from a naturally-occurring lithium-containing mineral comprising lixiviating the mineral with a water solution of a neutral metal salt containing lime in an amount sufficient to prevent precipitation of silicic acid as a gel on the mineral surfaces but insufficient to materially increase the amount of siliceous material dissolved out of the mineral, thereby obtaining a lixivium containing lithium in the form of a relatively water-soluble compound thereof; and recovering lithium compound from said lixivium.

7. A method as in claim 2, in which the neutral metal salt is an alkali metal salt.

8. A method as in claim 2, in which the neutral metal salt is sodium sulphate.

9. A method as in claim 2, in which the neutral metal salt is sodium chloride.

10. A method as in claim 2, in which the step of lixiviation is performed at a temperature between 100° and 300° C., and at a corresponding superatmospheric pressure.

AXEL RUDOLF LINDBLAD.
SVEN JOHAN WALLDÉN.
KARL ARNE SIVANDER.